United States Patent
Fujita et al.

(10) Patent No.: US 9,960,688 B2
(45) Date of Patent: May 1, 2018

(54) DC POWER SUPPLY WITH MULTI-CELL CONVERTER

(71) Applicant: FUJI ELECTRIC CO., LTD., Kawasaki-shi, Kanagawa (JP)

(72) Inventors: Satoru Fujita, Tachikawa (JP); Ryuji Yamada, Hachioji (JP)

(73) Assignee: FUJI ELECTRIC CO., LTD., Kawasaki-Shi, Kanagawa (JP)

(*) Notice: Subject to any disclaimer, the term of this patent is extended or adjusted under 35 U.S.C. 154(b) by 0 days. days.

(21) Appl. No.: 15/366,003

(22) Filed: Dec. 1, 2016

(65) Prior Publication Data

US 2017/0214324 A1  Jul. 27, 2017

(30) Foreign Application Priority Data

Jan. 22, 2016 (JP) ................ 2016-010978

(51) Int. Cl.
H02M 3/335 (2006.01)
H02M 7/217 (2006.01)
H02M 1/00 (2006.01)

(52) U.S. Cl.
CPC ....... *H02M 3/33507* (2013.01); *H02M 7/217* (2013.01); *H02M 2001/0074* (2013.01)

(58) Field of Classification Search
CPC ..... H02M 2001/0074; H02M 3/33507; H02M 7/217

See application file for complete search history.

(56) References Cited

U.S. PATENT DOCUMENTS

| 5,392,753 | A * | 2/1995 | Burson | F02P 1/086 |
| | | | | 123/406.57 |
| 6,026,004 | A * | 2/2000 | Cross | H02M 7/10 |
| | | | | 363/147 |
| 2007/0215897 | A1* | 9/2007 | Shen | H01L 23/481 |
| | | | | 257/103 |
| 2008/0024261 | A1* | 1/2008 | Shinmen | H01F 27/326 |
| | | | | 336/208 |

FOREIGN PATENT DOCUMENTS

| EP | 2290799 A1 | 3/2011 |
| WO | WO-2014/026840 A2 | 2/2014 |

OTHER PUBLICATIONS

Matthias Kasper et al., "Hardware Verification of a Hyper-Efficient (98%) and Super-Compact (2.2kW/dm$^3$) Isolated AC/DC Telecom Power Supply Module based on Multi-Cell Converter Approach", Applied Power Electronics Conference and Exposition (APEC) 2015 IEEE, pp. 65-71, Mar. 15-19, 2015.

* cited by examiner

*Primary Examiner* — Jue Zhang
*Assistant Examiner* — Lakaisha Jackson
(74) *Attorney, Agent, or Firm* — Rabin & Berdo, P.C.

(57) ABSTRACT

A direct current (DC) power supply, including a plurality of first printed circuit boards (PCBs) disposed on a primary side of the DC power supply, a plurality of alternating current (AC)/DC converter circuits having different potentials, each formed on a different one of the plurality of first PCBs, a second PCB disposed on a secondary side of the DC power supply, and a plurality of DC/DC converter circuits having an equal potential disposed on the second PCB. The AC/DC converter circuits are electrically connected in series and connected to an AC input of the DC power supply. The DC/DC converter circuits are electrically connected in parallel and connected to a DC output of the DC power supply.

7 Claims, 9 Drawing Sheets

DC POWER SUPPLY WITH MULTI-CELL CONVERTER

CROSS REFERENCE TO RELATED APPLICATION

This application is a non-provisional application based upon and claims priority to the prior Japanese patent application No. JP 2016-010978, filed on Jan. 22, 2016, the entire contents of which are incorporated herein by reference.

FIELD

The present disclosure relates to a DC (direct current) power supply that uses a multi-cell converter approach, wherein separate substrates are used on a primary side and on a secondary side and an in-common printed circuit board according to a potential of an implemented circuit is used on the secondary side.

BACKGROUND

Patent Document 1 below discloses a power distribution system intended for a data center that uses a multi-cell converter circuit scheme.

Patent Document 2 below discloses bi-directional multi-level AC-DC converter arrangements.

However, Patent Documents 1 and 2 do not disclose any specific example of a structure of a multi-cell converter.

In Non Patent Document 1 below, a DC power supply is realized that uses a multi-cell converter approach with series connection at an AC input and parallel connection at a DC output.

Figure 1A:
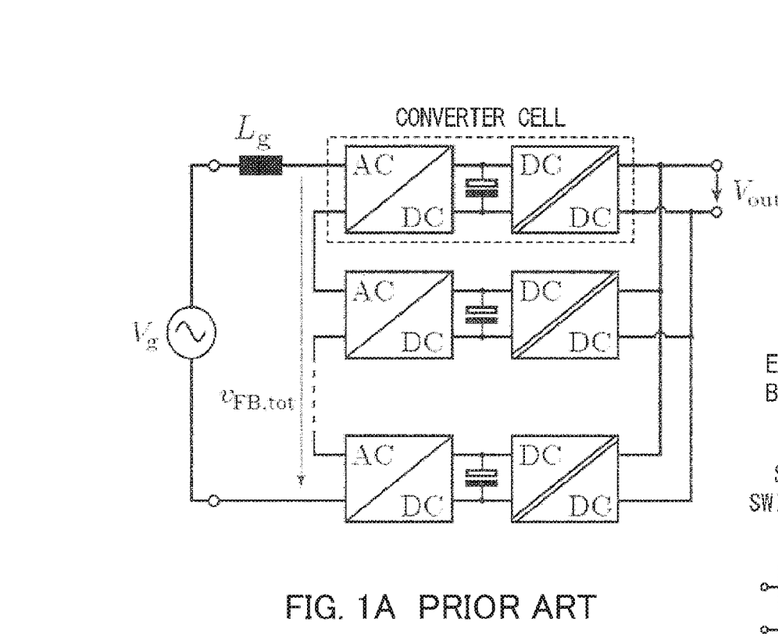
FIGS. 1A to 1C are diagrams that explain a conventional example of a configuration of a DC power supply that uses a multi-cell converter approach that is disclosed in Non Patent Document 1.
Figures 1B, 1C:
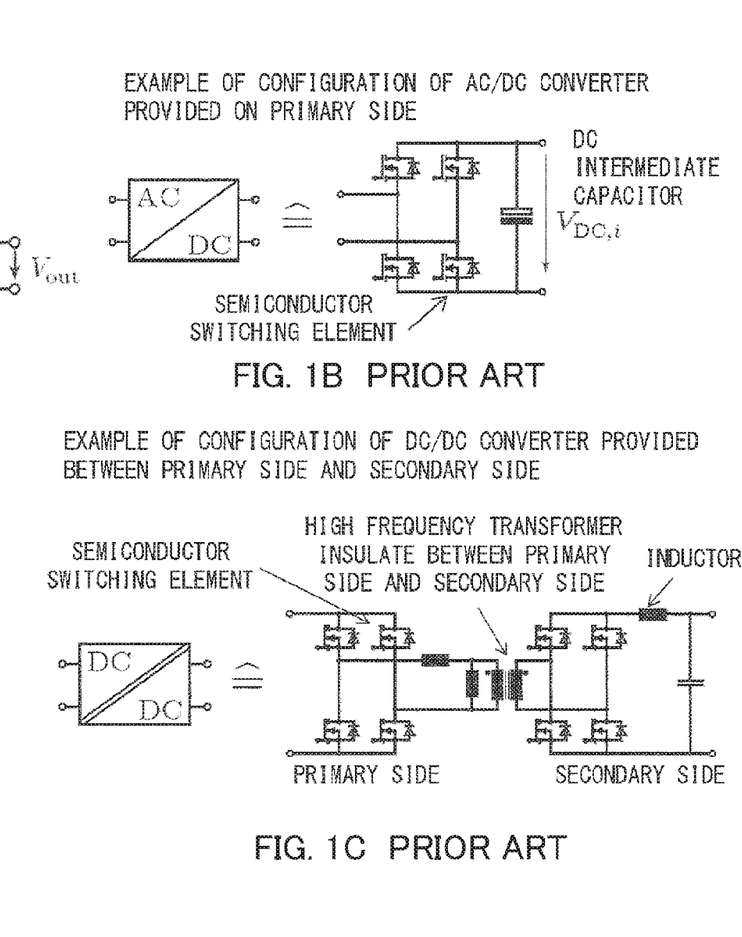

FIGS. 1A to 1C are diagrams that explain an example of a configuration of a DC power supply that uses a multi-cell converter approach that is disclosed in Non Patent Document 1 below.

FIGS. 1A to 1C illustrate an example in which implementation on a printed circuit board is performed for each converter cell (a structure of a pair of an AC/DC converter circuit and an insulated DC/DC converter circuit: 1:1), and as illustrated in FIG. 1A, the DC power supply is configured by connecting a plurality of converter cells in series at an AC input and in parallel at a DC output.

FIG. 1B illustrates an example of a circuit configuration of an AC/DC converter portion inside the converter cell of FIG. 1A, wherein an input AC is rectified through four semiconductor switching elements so as to be converted into a direct current. The direct current obtained by the conversion is held in a DC intermediate capacitor. This configuration itself is well-known to a person skilled in the art, so a further description of it is omitted.

FIG. 1C illustrates an example of a circuit configuration of a DC/DC converter portion inside the converter cell of FIG. 1A, wherein a switching control is performed by a controller (not illustrated) on four semiconductor switching elements so as to convert the DC input from the DC intermediate capacitor into AC, a primary side is connected to a secondary side in a state in which insulation has been obtained by a high-frequency transformer between the primary side and the secondary side, and a switching control is performed by a controller (not illustrated) on four semiconductor switching elements provided on the secondary side so as to convert the AC into DC to be taken out as an output. This configuration itself is well-known to a person skilled in the art, so a further description of it is omitted.

Figure 2:
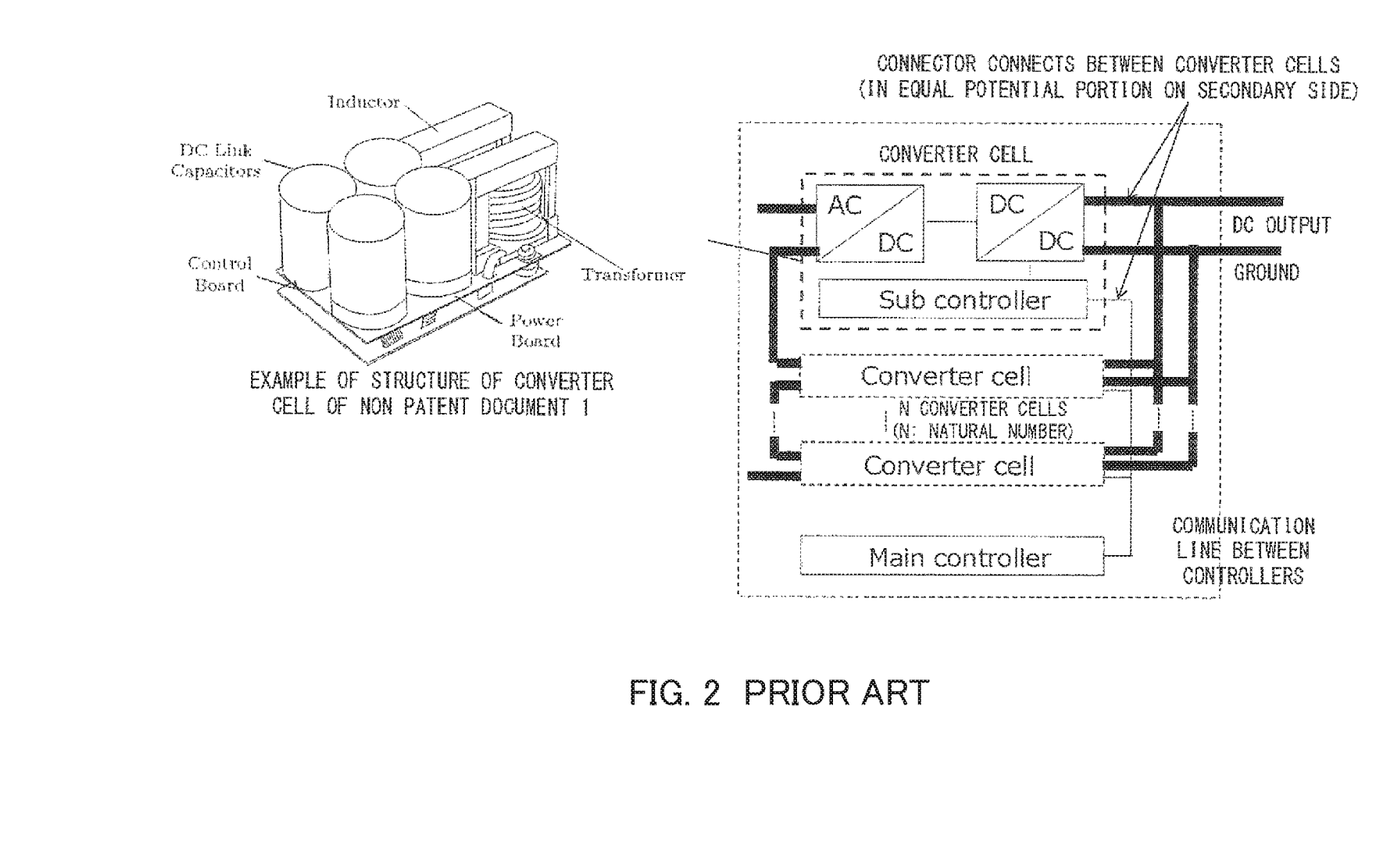
FIG. 2 is a diagram that explains a conventional structure of a printed circuit board that is disclosed in Non Patent Document 1.

FIG. 2 is a diagram that explains an example of a conventional structure of a printed circuit board that is disclosed in Non Patent Document 1 below. FIG. 2 illustrates a specific example in which implementation on a printed circuit board (a control board and a power board) is performed for each converter cell (an AC/DC converter circuit and an insulated DC/DC converter circuit).

As illustrated on the right side of FIG. 2, a connector (not illustrated) connects cells. This will be described in FIG. 3.

The DC power supply of Non Patent Document 1 described above is intended for a low voltage of an AC 200 V-type, but there is no mention of a voltage higher than that, that is, a high voltage such as AC 3300 V.

Figure 3:
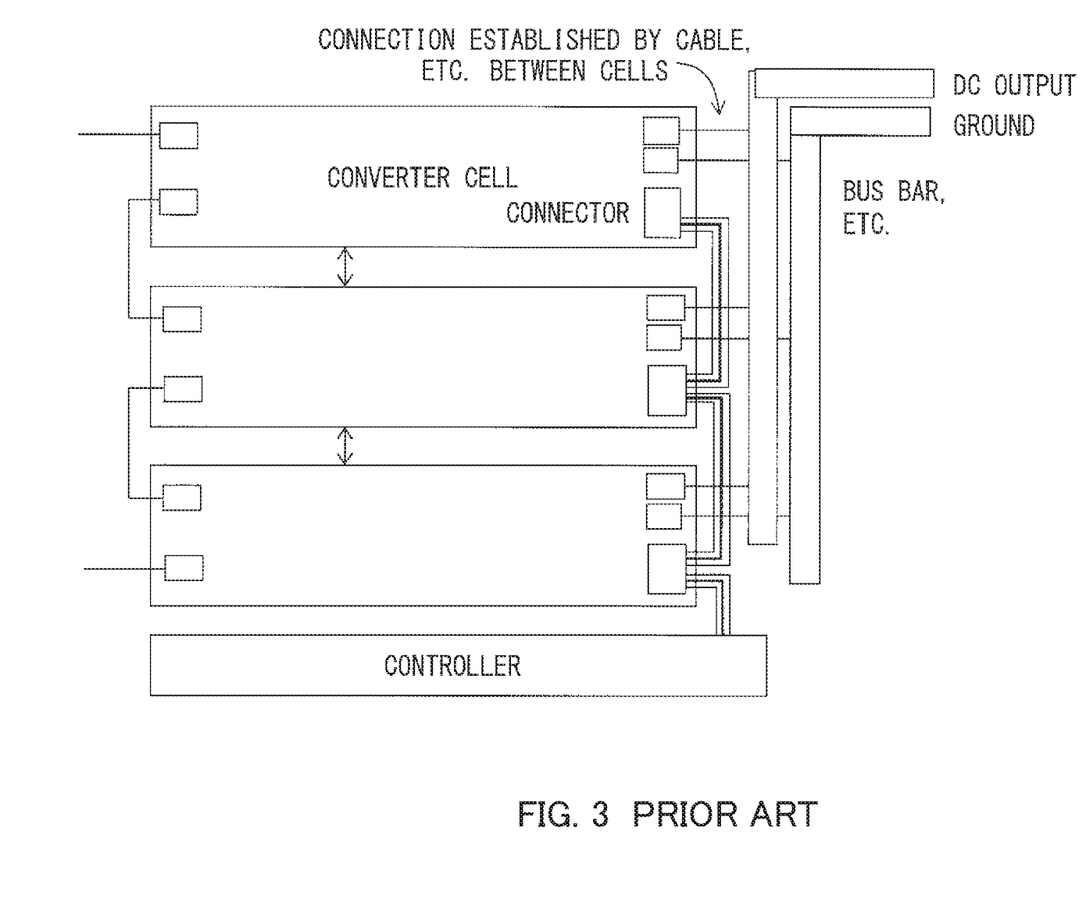
FIG. 3 illustrates an example of an arrangement and connection between cells when the conventional implementation of a converter cell on a printed circuit board is performed for each converter cell.

FIG. 3 illustrates an example of an arrangement and connection between cells when the conventional implementation on a printed circuit board is performed for each converter cell.

As illustrated in FIG. 3, each converter cell is connected to a DC output through a bus bar using a cable, and a control signal is obtained from a controller that is connected to one of the converter cells using a cable including a connector, wherein the converter cells are series connected using cables including connectors.

Further, on the primary side, converter cells are at a high potential and have potentials different from one another, so they are spaced at a predetermined insulating distance from one another.

The following problems have occurred because the structure of a printed circuit board in the example described above has a configuration as illustrated in FIGS. 2 and 3.

A connector connection or a cable connection has to be used in order to connect a DC output on the secondary side to, for example, a bus bar and in order to transmit a control signal from the controller to the converter cells, and a separate interface is needed for the connection.

Further, some measures have to be taken in advance in order not to lower the reliability due to the occurrence of a bad connector connection or a cable disconnection, which results in high costs. In addition, there is a need to provide an insulating distance between cells, so a device is made larger.

Patent Document 1: WO2014/026840A2 (FIG. 2)
Patent Document 2: EP2290799A1 (FIG. 1A)
Non Patent Document 1: Matthias Kasper, "Hardware Verification of a Hyper-Efficient (98%) and Super-Compact (2.2 kW/dm3) Isolated AC/DC Telecom Power Supply Module based on Multi-Cell Converter Approach", (APEC 2015), P 65-P 71

DISCLOSURE OF EMBODIMENT

The present disclosure is to provide a DC power supply that uses a multi-cell converter approach, wherein separate substrates are used on a primary side and on a secondary side and an in-common printed circuit board according to a potential of an implemented circuit is used on the secondary side because parallel connection has been established, so as to realize downsizing and cost reduction while retaining high reliability.

In embodiments, in order to achieve the above, a DC power supply is provided that has a multi-cell converter configuration with series connection at an AC input and parallel connection at a DC output, wherein
wiring is located on an in-common printed circuit board on a secondary side in which DC/DC converter circuits having an equal potential are implemented, and separate printed circuit boards whose number corresponds to the number of series connections at the AC input are provided on a primary side in which AC/DC converter circuits having different potentials are implemented so as to locate wiring on each of the separate printed circuit boards, which results in optimizing a structure of a printed circuit board according to a circuit potential.

According to embodiments of the present disclosure, the structure of a printed circuit board is optimized according to a circuit potential, so as to reduce wiring between converter cells and dead space between substrates, which permits downsizing and cost reduction of a DC power supply, wherein, in the conventional structure of a printed circuit board, implementation on a printed circuit board is performed for each converter cell (a structure of a pair of an AC/DC converter circuit and an insulated DC/DC converter circuit: 1:1).

Further, configurations according to the embodiments of the present disclosure permit a reduction in the number of connectors or wirings, which results in the ability to improve the reliability.

DESCRIPTION OF EMBODIMENTS

Embodiments of the present disclosure will now be described in detail with reference to the drawings.

First Embodiments

Figure 4:
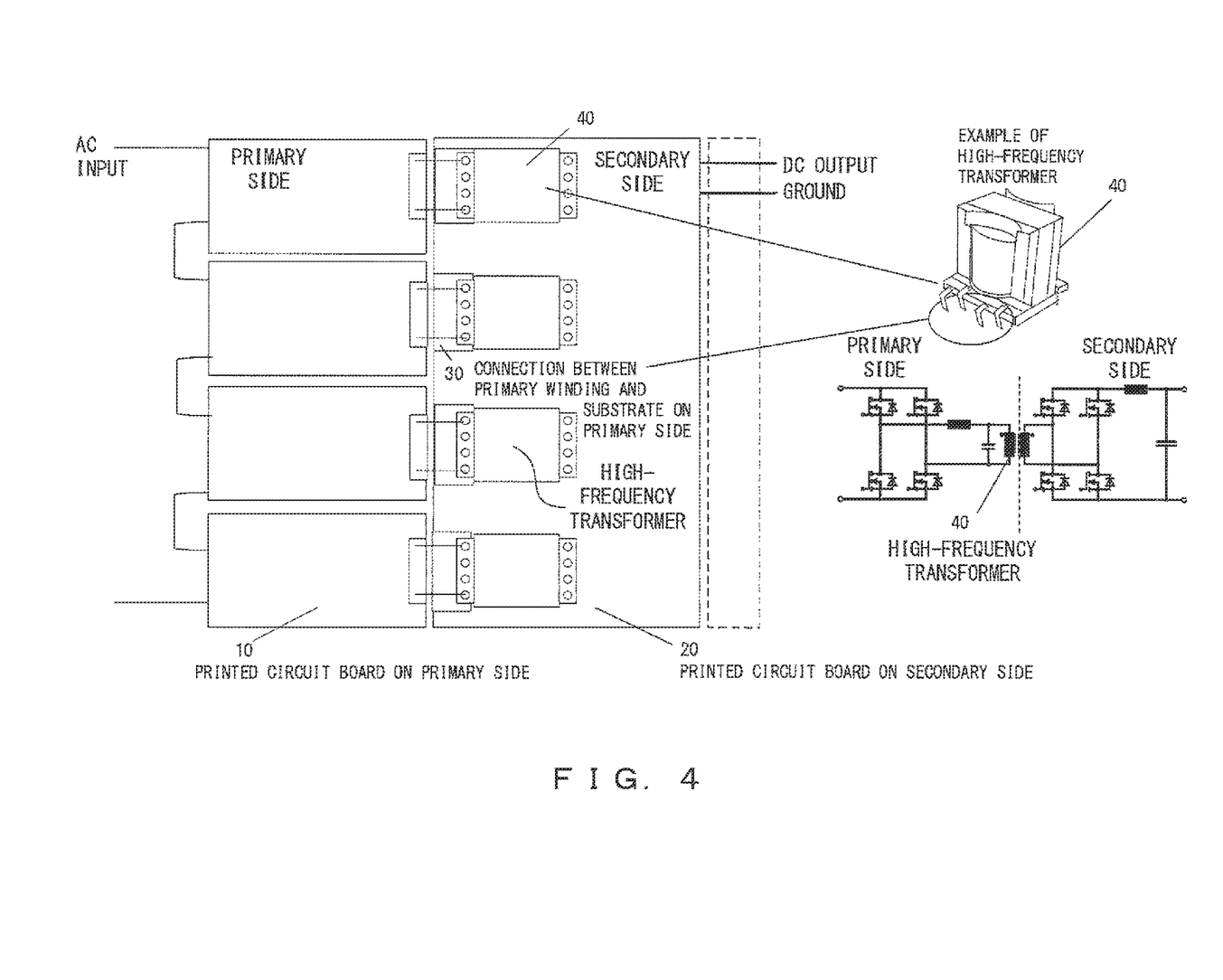
FIG. 4 illustrates a configuration of a DC power supply that uses a multi-cell converter approach according to first embodiments of the present disclosure.

FIG. 4 illustrates a configuration of a DC power supply that uses a multi-cell converter approach according to first embodiments of the present disclosure.

In FIG. 4, the DC power supply that uses a multi-cell converter approach according to the first embodiments has a multi-cell converter configuration with series connection at an AC input and parallel connection at a DC output.

Then, wiring is located on an in-common printed circuit board on a secondary side in which DC/DC converter circuits having an equal potential are implemented, and separate printed circuit boards whose number corresponds to the number of series connections at the AC input are provided on a primary side in which AC/DC converter circuits having different potentials are implemented so as to locate wiring in each of the separate printed circuit boards, which results in optimizing a structure of a printed circuit board according to a circuit potential.

This point is described specifically. As described on the left side of FIG. 4, in the structure of a printed circuit board according to embodiments of the present disclosure, four printed circuit boards corresponding to the number of series connections at the AC input are arranged on the primary side, and one in-common printed circuit board 20 is arranged on the secondary side with respect to these four printed circuit boards 10 arranged on the primary side.

Then, on the primary side, the four printed circuit boards 10 are connected in series at the AC input, using, for example, cables, and AC/DC converter circuits having different potentials are implemented on the respective printed circuit boards on the primary side. On the other hand, on the secondary side, DC/DC converter circuits having an equal potential are implemented in one in-common printed circuit board 20 and a DC output is obtained from the output side on which parallel connection has been established.

On the secondary side, a high-frequency transformer 40 illustrated on the right side of FIG. 4 is provided on the printed circuit board 20 to correspond to each printed circuit board 10 on the primary side, and a terminal of a primary winding of the provided high-frequency transformer 40 is connected to the printed circuit board 10 on the primary side through a connection 30 between the primary winding and a substrate on the primary side. Here, the connection 30 between the primary winding and the substrate on the primary side may be resin-encapsulated to enhance insulation.

A circuit of the high-frequency transformer 40 on the secondary side, a control signal line connecting from a controller (not illustrated) to each converter cell (not illustrated), and a DC output line are wired on the printed circuit board 20 on the secondary side. On the secondary side, if wiring is located between outputs according to the pattern on the in-common printed circuit board 20, it becomes possible to eliminate, for example, a connector or a cable conventionally used to locate each wiring between circuits on a secondary side, so as to reduce the cost for it and to improve the reliability.

The following provides a summary of exemplary structures of a printed circuit board according to the first embodiments described above.

(1) Use an in-common printed circuit board on a secondary side in which DC/DC converter circuits having an equal potential are implemented.

(2) Use separate printed circuit boards on a primary side having different potentials and on the secondary side using the in-common printed circuit board, and arrange, on the primary side, separate printed circuit boards whose number corresponds to the number of series connections at an AC input.

(3) Locate each wiring on the secondary side according to the pattern on the in-common printed circuit board.

such a structure of a printed circuit board according to embodiments permits a reduction in the cost of, for example, a connector or a cable that was used conventionally, and also permits a prevention of, for example, a bad connection that occurred conventionally so as to improve reliability.

It is also possible to reduce dead space by eliminating, for example, a connector or a cable used in the conventional example, which results in the ability to downsize a DC power supply.

Further, a portion (which is shown by a dotted line in FIG. 4) such as a bus bar conventionally used to establish connection outside cell converters is reduced. Conventionally, cell converters have been spaced at a distance from one another on the secondary side in order to perform position adjustment between the primary side and the secondary side. In the present embodiment, wiring is located on one printed circuit board 20 on the secondary side, so there is no need for dead space (see the double-headed arrows of FIG. 3). Therefore, the printed circuit board can be downsized.

In the first embodiments, an example in which the number of printed circuit boards used on the secondary side is one (4:1) has been described, but the separation ratio may be changed so that the number of printed circuit boards on the secondary side is two (4:2). Further, the number of printed circuit boards arranged on the primary side may be increased so that the separation ratio is set to be, for example, 5:1.

Second Embodiments

Figure 5:
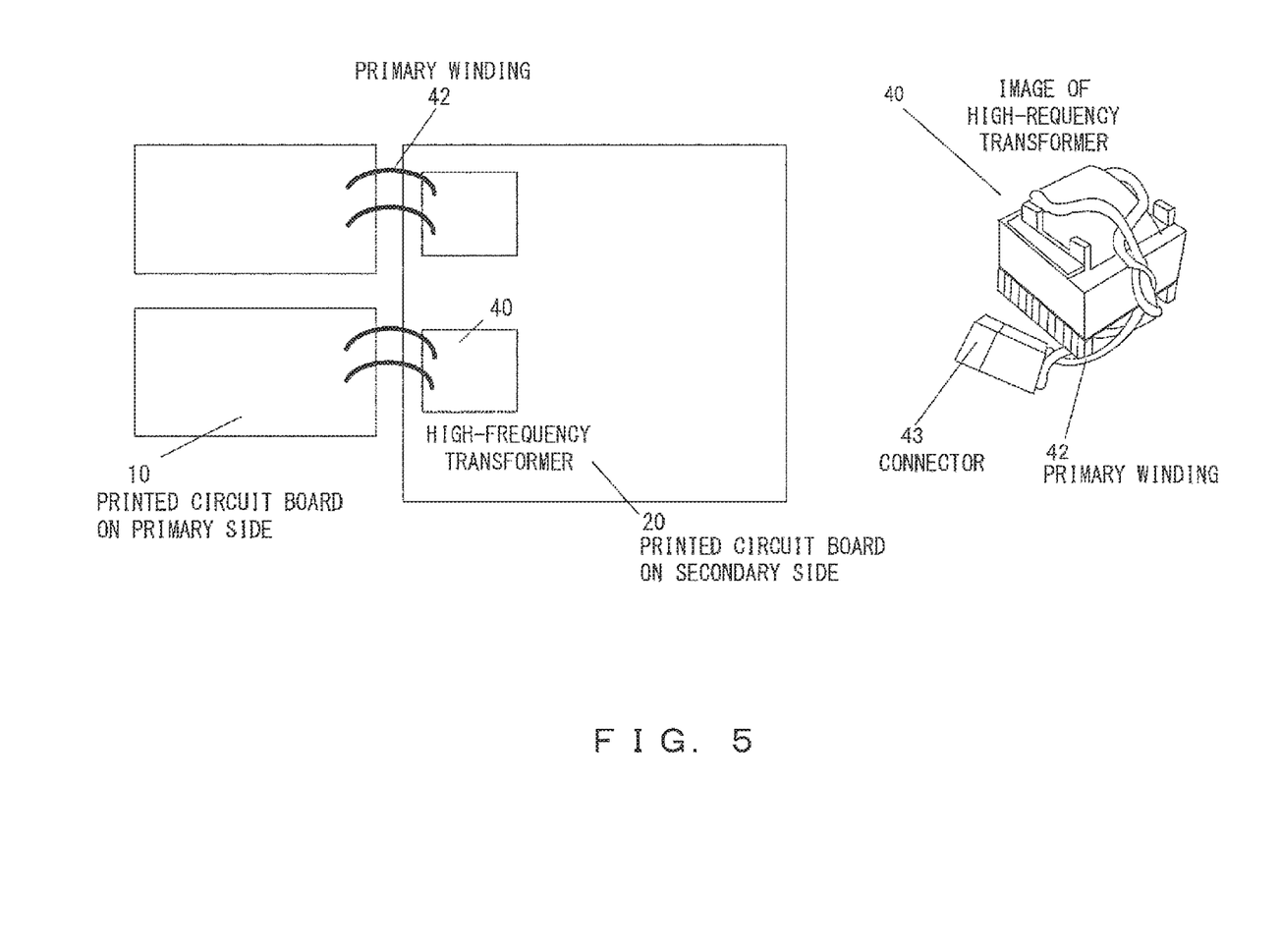
FIG. 5 illustrates an example (Part 1) of a configuration of the DC power supply that uses a multi-cell converter approach according to second embodiments of the present disclosure.

FIG. 5 illustrates an example (Part 1) of a configuration of the DC power supply that uses a multi-cell converter approach according to second embodiments of the present disclosure in which, compared with the configuration of FIG. 4, a primary winding 42 of the high-frequency transformer 40 is connected to the printed circuit board 10 on the primary side, the primary winding 42 being isolated from the printed circuit board 20 on the secondary side.

In FIG. 5, wiring is located on the in-common printed circuit board 20 on the secondary side in which DC/DC converter circuits having an equal potential are implemented, and separate printed circuit boards 10 whose number corresponds to the number of series connections at the AC input are provided on the primary side in which AC/DC converter circuits having different potentials are implemented so as to locate wiring in each of the separate printed circuit boards.

Accordingly, a structure of a printed circuit board is optimized according to a circuit potential, and the high-frequency transformer 40 is then provided in the in-common printed circuit board 20 as in the configuration of FIG. 4, so as to connect the primary winding 42 of the high-frequency transformer 40 to the printed circuit board 10 on the primary side through an insulating cable and a connector 43, the primary winding 42 being in an isolated state as illustrated in the image on the right side of FIG. 5.

Such a configuration according to the second embodiments permits the printed circuit board 20 on the secondary side to have a low potential portion only so as to further shorten an insulating distance between the primary side and the secondary side because insulation has been increased between the primary side and the secondary side, which results in the ability to further downsize a DC power supply.

Figure 6:
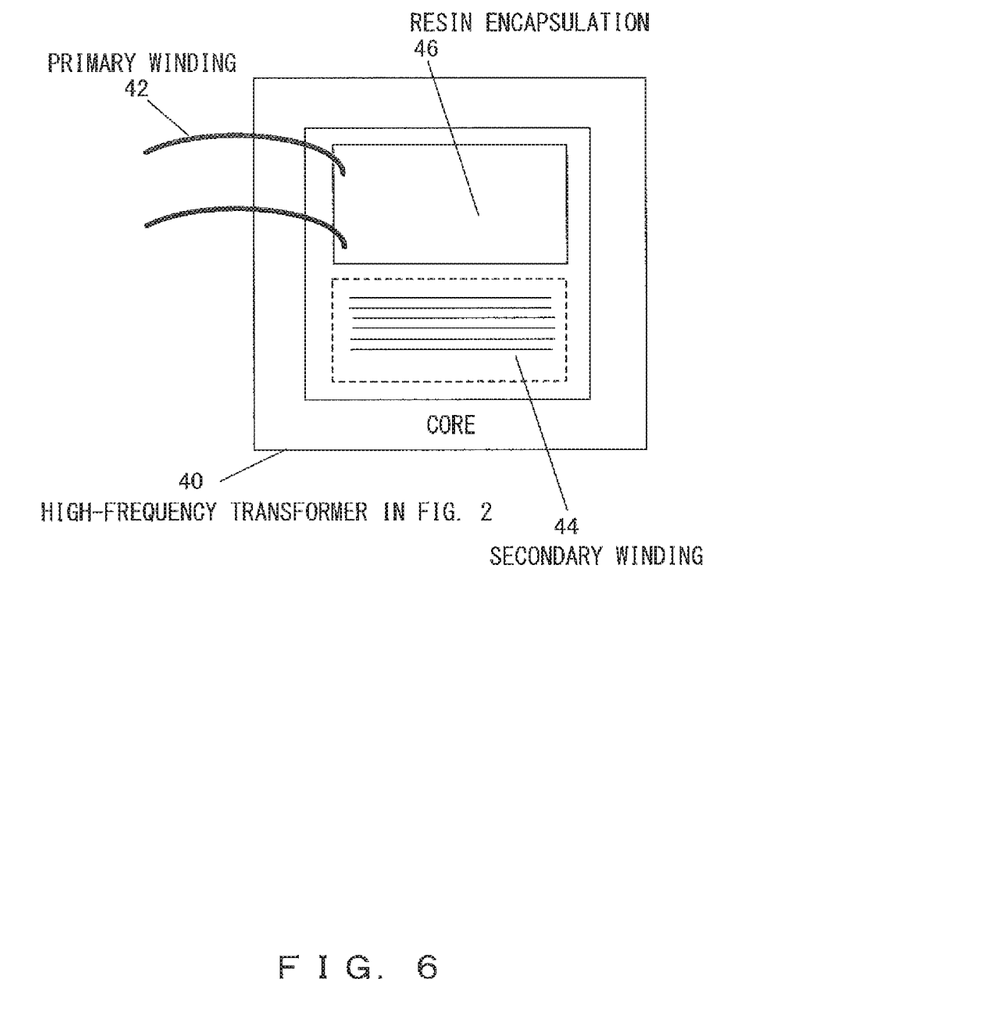
FIG. 6 illustrates the example (Part 2) of the configuration of the DC power supply that uses a multi-cell converter approach according to the second embodiments.

FIG. 6 illustrates the example (Part 2) of the configuration of the DC power supply that uses a multi-cell converter approach according to the second embodiments, in which only a configuration of the high-frequency transformer 40 of FIG. 5 is focused on and configurations of others are omitted.

The configuration of the high-frequency transformer 40 of FIG. 6 is a modification of the configuration of the high-frequency transformer 40 of FIG. 5, in which the high-frequency transformer 40 is provided with a secondary winding 44 separately from the primary winding 42, and a portion other than a lead line of the primary winding 42 is then resin-encapsulated (molded) 46.

Such a modification of the configuration according to the second embodiments permits an increase in insulation performance (withstand voltage), which makes it possible to further improve the reliability.

Third Embodiments

Figure 7:
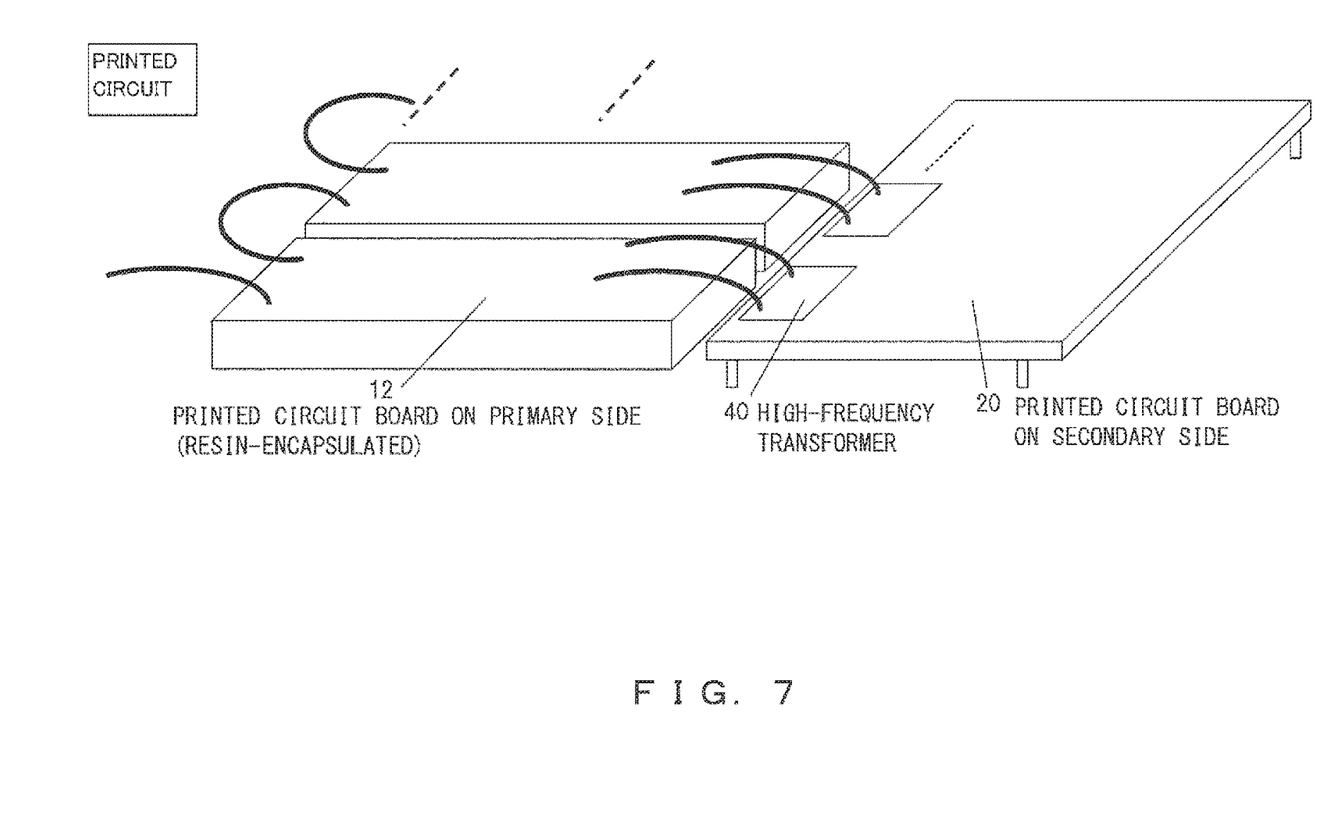
FIG. 7 illustrates a configuration of the DC power supply that uses a multi-cell converter approach according to third embodiments of the present disclosure.

FIG. 7 illustrates a configuration of the DC power supply that uses a multi-cell converter approach according to third embodiments of the present disclosure.

The DC power supply that uses a multi-cell converter approach according to the third embodiments in FIG. 7 has a configuration in which, compared with the configuration of FIG. 5, the printed circuit board 10 on the primary side is partially or entirely molded with resin ("12" is given to a molded printed circuit board in FIG. 7) so as to further improve heat resistance, water proofing, and flame resistance, which results in further improving the reliability.

Further, if a high-voltage portion (not illustrated) implemented on the printed circuit board 12 on the primary side is partially or entirely molded to be insulated from its surroundings, a distance between the printed circuit boards on the primary side, or a distance between each of the printed circuit boards on the primary side and the printed circuit board on the secondary side, is reduced, which results in the ability to further downsize a DC power supply.

If only a high-voltage portion (not illustrated) implemented on the printed circuit board 12 on the primary side is resin-encapsulated (molded), it is possible to suppress an increase in cost.

A resin that has all of the excellent properties of heat resistance, flame resistance, and insulation (such as urethane resin) will be selected as a resin used for encapsulation.

Fourth Embodiments

Figure 8:
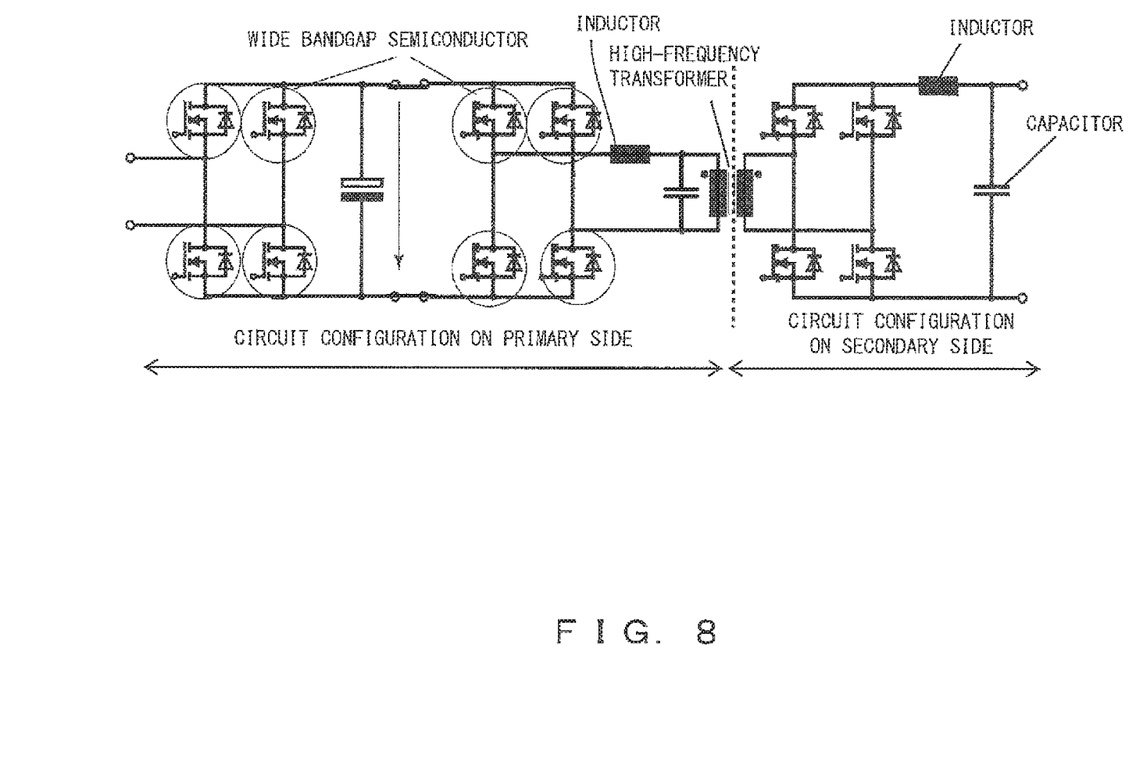
FIG. 8 illustrates a configuration (circuit configuration) of the DC power supply that uses a multi-cell converter approach according to fourth embodiments of the present disclosure.

FIG. 8 illustrates a configuration (circuit configuration) of the DC power supply that uses a multi-cell converter approach according to fourth embodiments of the present disclosure.

In the circuit configuration of the DC power supply that uses a multi-cell converter approach according to the fourth embodiments in FIG. 8, a wide-bandgap semiconductor device is used as a portion of or all of the semiconductor devices implemented on the printed circuit board on the primary side (such as a diode or a switching element).

In the example of FIG. 8, a semiconductor device for which the wide-bandgap semiconductor device is used is circled for clarity.

It is preferable that the wide-bandgap semiconductor device used in the fourth embodiments be realized by silicon carbide (SiC), gallium nitride (GaN), gallium oxide ($Ga_2O_3$), diamond, or any combination of thereof.

The wide-bandgap semiconductor device is characterized in that high withstand voltage can be realized more easily with it than with a switching element made of Si (silicon).

If a multi-cell converter approach is used for a configuration of a DC power supply, it is possible to deal with a high voltage using a semiconductor device of a relatively low withstand voltage, but if a semiconductor device of a high withstand voltage such as the wide-bandgap semiconductor device described above is used, it is possible to provide a configuration that makes it possible to deal with a much higher AC voltage.

For example, in the circuit configuration illustrated on the left side of FIG. 8, if a semiconductor device of 3300-V withstand voltage is used and a circuit at the AC input is configured to include five groups connected in series, the circuit has a withstand voltage equivalent to 16, 500 V (=5×3300 V) in total, which results in the ability to realize a DC power supply that can be directly connected to a 6600-V AC system.

Voltage is remarkably increased on the primary side at this point, so if the structure of a printed circuit board of the second and third embodiments described above (such as printed circuit board molding) is used, it is possible to realize a downsized DC power supply that can deal with the dielectric withstand voltage.

Fifth Embodiments

Figure 9:
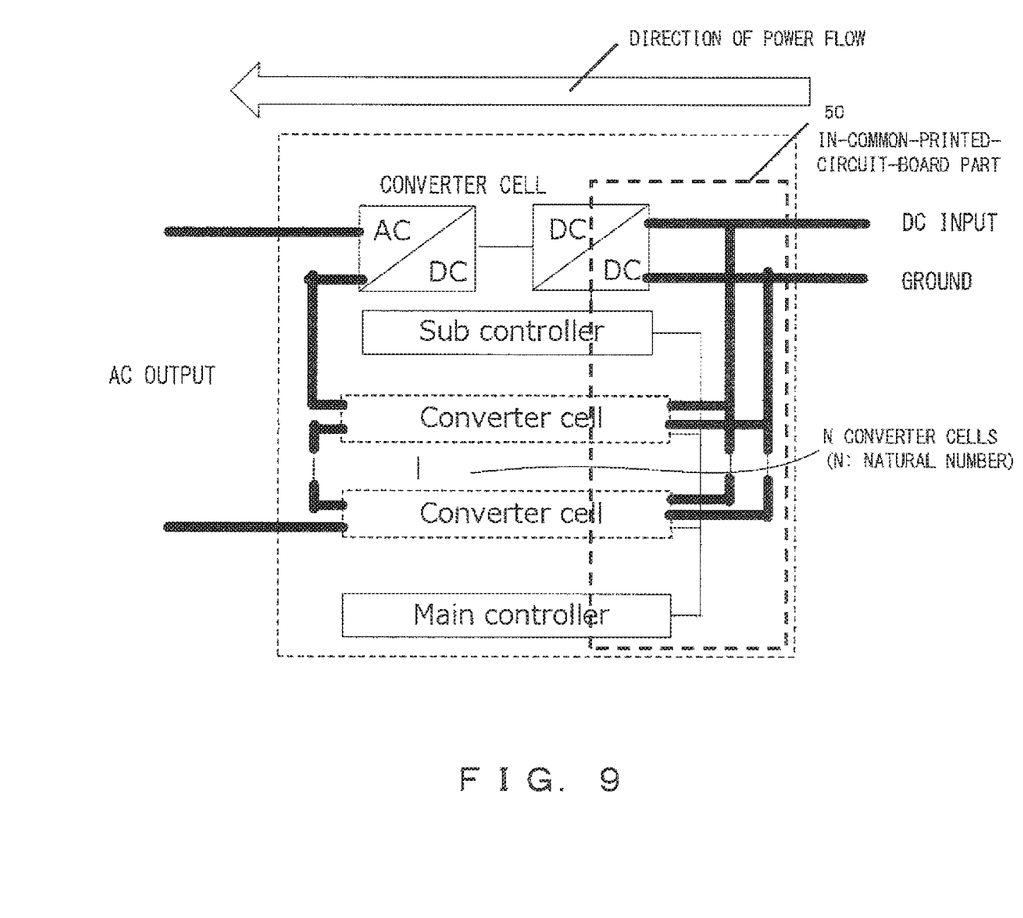
FIG. 9 illustrates a configuration of the DC power supply that uses a multi-cell converter approach according to fifth embodiments of the present disclosure.

FIG. 9 illustrates a configuration of the DC power supply that uses a multi-cell converter approach according to fifth embodiments of the present disclosure.

The circuit configuration of the DC power supply in FIG. 9 is described to mimic the conventional example of the circuit configuration illustrated on the right side of FIG. 2.

However, in the configuration of the DC power supply of FIG. 9, the secondary side in which DC/DC converter circuits having an equal potential are implemented is configured as an in-common-printed-circuit-board part 50 (see the portion surrounded by dashed lines in the converter cell of FIG. 9), so it is obviously different from the conventional example of the structure of a printed circuit board illustrated in FIG. 2.

Further, in the functional configuration of the power supply of FIG. 9, a power flow is directed against the direction of a power flow in the DC power supply of FIG. 4 or 8 (see the arrow situated on the top in the figure), which indicates that the embodiments of the present disclosure are applicable even if the power flow in the power supply of FIG. 4 or 8 is different (is directed in reverse).

For example, the embodiments of the present disclosure are applicable to a configuration for realizing an inverter that starts with a DC input (which is, for example, connected to a battery) described on the right side of the circuit of FIG. 9 and takes out an AC output described on the left side of the circuit.

INDUSTRIAL APPLICABILITY

According to the embodiments of the present disclosure, it is possible to use a device as a downsized DC power supply even if a plurality of servers are under load.

What is claimed is:

1. A direct current (DC) power supply, comprising:
a plurality of first printed circuit boards (PCBs) located on a primary side of the DC power supply;
a plurality of alternating current (AC)/DC converter circuits having different potentials, each formed on a different one of the plurality of first PCBs;
a single second PCB containing circuitry components located on a secondary side of the DC power supply; and
a plurality of DC/DC converter circuits having an equal potential located on the single second PCB, each DC/DC converter having a transformer therein, the transformers being formed on one PCB that is the single second PCB, wherein
the AC/DC converter circuits are electrically connected in series and connected to an AC input of the DC power supply; and
the DC/DC converter circuits are electrically connected in parallel and connected to a DC output of the DC power supply.

2. The DC power supply according to claim 1, wherein the primary side of the DC power supply and the secondary side of the DC power supply are connected to each other via the transformers that are each a high-frequency transformer, and are insulated from each other.

3. The DC power supply according to claim 2, wherein each of the high-frequency transformers has a primary winding that is connected to a corresponding one of the first PCBs and that is insulated by resin.

4. The DC power supply according to claim 1, wherein at least one of the plurality of first PCBs has a wide-bandgap semiconductor device formed thereon.

5. The DC power supply according to claim 1, wherein at least one of the plurality of first PCBs has a device implemented thereon that is partially or entirely molded with resin.

6. The DC power supply according to claim 5, wherein at least one of the plurality of first PCBs has a wide-bandgap semiconductor device formed thereon.

7. The DC power supply according to claim 1, wherein at least one of the plurality of first PCBs has a wide-bandgap semiconductor device formed thereon.

* * * * *